INVENTOR
Howard P. Andreasen
ATTORNEYS

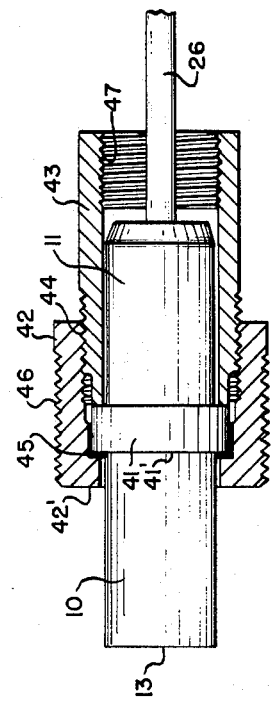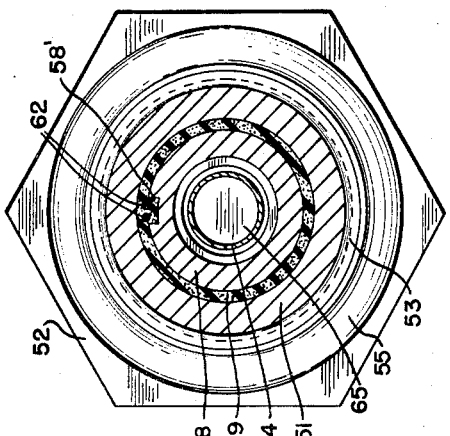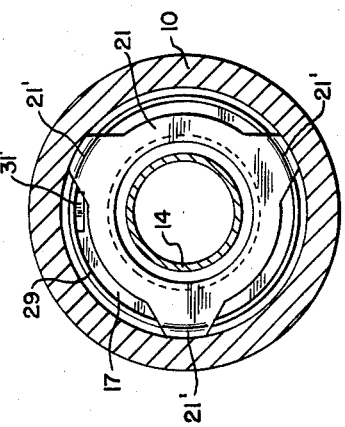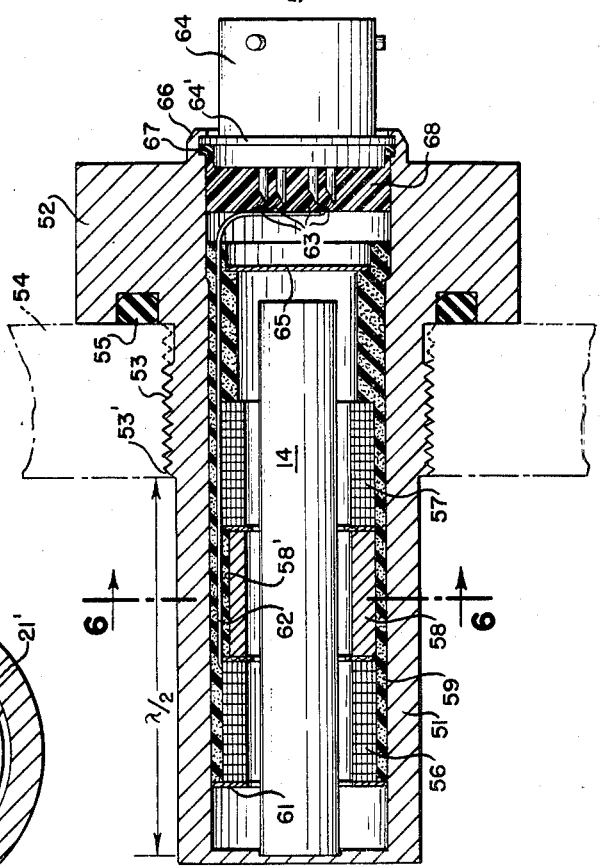
INVENTOR
Howard P. Andreasen
BY
ATTORNEYS

United States Patent Office 3,210,725
Patented Oct. 5, 1965

3,210,725
ACOUSTIC TRANSDUCER WITH DIAPHRAGM CLAMPED BY A HALF-WAVELENGTH SPACED CASING SUPPORT
Howard P. Andreasen, West Des Moines, Iowa, assignor to Delavan Manufacturing Company, Inc., West Des Moines, Iowa, a corporation of Iowa
Filed Sept. 5, 1961, Ser. No. 136,108
15 Claims. (Cl. 340—17)

This invention relates to acoustic transducers, particularly transducers for use at ultrasonic frequencies.

Ultrasonic transducers are well known at the present time. Commonly they are designed to convert an electric wave (voltage or current, as the case may be) into an ultrasonic wave, and vice versa. When used for transmitting, the transducer is energized with the electric wave and transmits an ultrasonic wave. As a receiver, the ultrasonic wave impinges on the transducer and produces an output electric wave.

The transducers commonly have magnetostrictive elements or piezoelectric crystals to convert from electric to acoustic energy, and vice versa, although other types of actuating elements are sometimes employed. Mechanical resonance is often employed to improve efficiency, and is especially useful for narrow band transducers designed to transmit or receive ultrasonic energy in a narrow frequency range. Such transducers are frequently expensive, and are often limited in stability, temperature range of operation, etc. In addition, problems in mounting are often encountered since in a resonant structure the manner of mounting the transducer may affect the frequency of operation and also the efficiency.

In application Serial No. 863,007, filed December 30, 1959, by Wilfred Roth for "Transducers," now Patent No. 3,070,790, a transducer is described having an oscillating diaphragm for delivering ultrasonic energy to a medium, or to receive energy therefrom. Suitable means such as a magnetostrictive element is provided to drive the diaphragm, or respond to motion thereof. The periphery of the diaphragm is attached to or formed as a part of a tubular dynamic clamping or choke member which functions by virtue of elastic waves propagating lengthwise thereof to provide a high impedance to axial movement of the diaphragm periphery, thereby causing the diaphragm to oscillate substantially as a clamped diaphragm. A ring mode of oscilltaion in the dynamic clamping member is also described, and yields important advantages.

In the specific embodiment described in the aforesaid application, the dynamic clamping member has its end away from the diaphragm free to move. With this construction, if the length is at or near a quarter-wavelength, or in general an odd multiple of quarter-wavelengths, a high impedance to movement of the diaphragm periphery in the axial direction is obtained. The diaphragm and clamping member may then be mounted in a protective casing, as by a thin annular section in the plane of the diaphragm.

The present invention is an improvement on the transducers described in the aforesaid application, and provides a construction which is better adapted to withstand high pressures and other severe environmental conditions, and has certain manufacturing advantages, while retaining in large measure other advantages of the aforesaid transducers.

In accordance with the present invention, the diaphragm periphery is united with a tubular casing, either by making it integral therewith or attached thereto, and the casing itself is designed to function as the dynamic clamping member. To this end the casing is arranged to be mass loaded at a predetermined axial distance from the diaphragm, and this distance is selected so that elastic waves propagating in the casing between the diaphragm and the position of mass loading effectively clamp the diphragm periphery and promote a maximum acoustic output. Generally the selected distance is approximately a half-wavelength at the transducer operating frequency. Thus, longitudinal elastic waves propagating lengthwise of the casing will dynamically clamp the periphery of the diaphragm, since the mass loading at approximately a half-wavelength from the diaphragm provides a high impedance to axial movement of its periphery. Advantageously the circumference and wall thickness of the tubular casing are predetermined to resonate in the ring mode of oscillation in the region of the diaphragm periphery as the diaphragm oscillates.

The mass loading of the casing at the predetermined axial distance may, at least in part, be provided by a suitably massive section rigid with the casing. However it is particularly contemplated to provide a mounting means for mounting the casing on a support which is so designed and located that the mass of the support is effective at the predetermined axial distance, and thereby provides a substantial portion of the mass loading for effectively clamping the diaphragm periphery.

It is preferred to make the predetermined distance approximately a half-wavelength in order to keep the overall length of the transducer small, and also to make the axial distance at which mass loading is applied less critical. However, in general the distance may be approximately a multiple of half-wavelengths, the term "multiple" being understood to include "one."

In the specific embodiments described, a magnetostrictive actuating element is employed, and special means are provided for mounting the cooperating coil and magnet structure in proper position within the casing without substantially impairing the elastic wave action in the casing.

The invention will be more fully understood from the following description of specific embodiments thereof, taken in conjunction with the drawings, in which:

FIG. 3 is a cross-section taken along the line 3—3 of FIG. 2;

FIG. 4 is a mounting assembly for the transducer of FIGS. 1 and 2;

FIG. 5 is a longitudinal cross-section of another embodiment of the invention; and FIG. 6 is a cross-section taken along the line 6—6 of FIG. 5.

Figure 1:
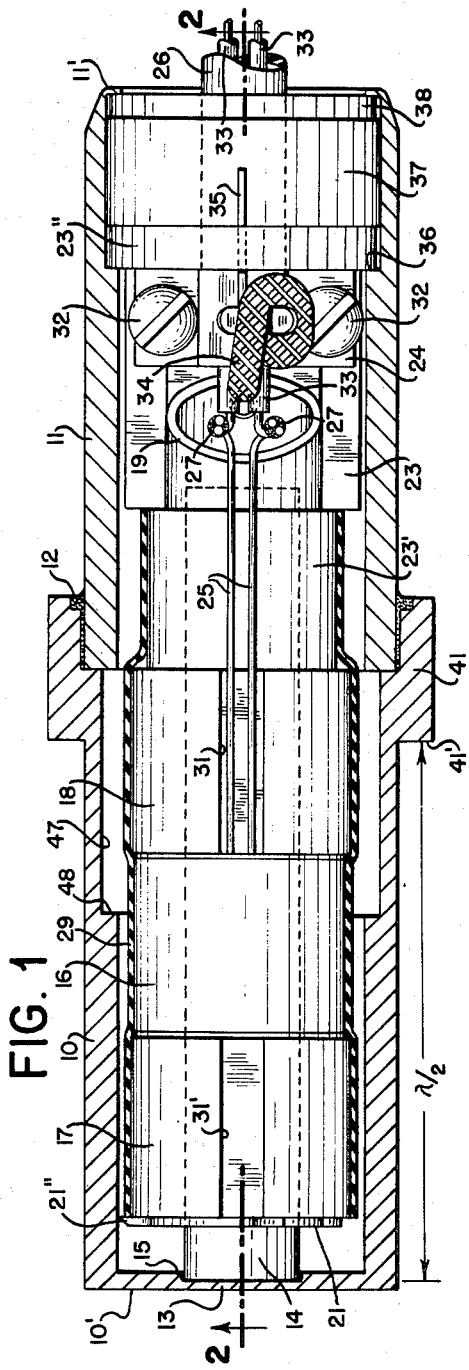
FIG. 1 is a longitudinal view, partly in cross-section, of one embodiment of the invention.
Figure 2:
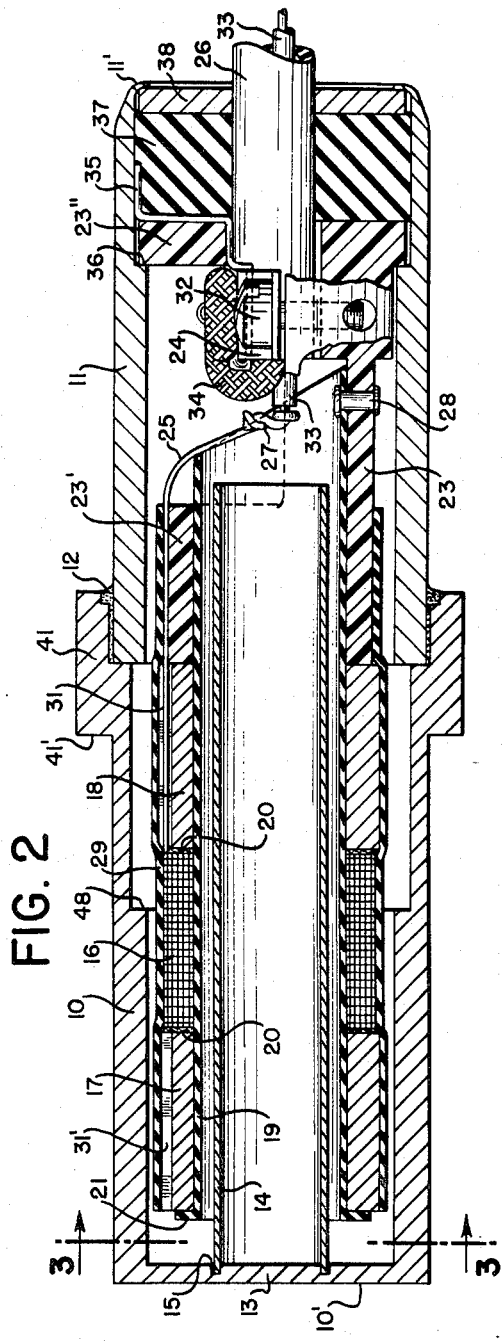
FIG. 2 is a longitudinal cross-section in a plane perpendicular to that of FIG. 1.

Referring to FIGS. 1 and 2, a transducer is shown having a casing formed in two parts 10 and 11, rigidly joined together as by brazing at 12 to form a unitary casing. The two-piece construction facilitates manufacture, but the casing may be made in one integral unit if desired.

Diaphragm 13 is located at one end of the casing, here termed the front end, and as shown is integral with section 10 of the casing. If desired, the diaphragm could be formed separately, and then strongly joined to the casing to form a united structure. The diaphragm and casing are advantageously of a metal suitable for the intended application, and stainless steel has been employed with success. Commonly, for ultrasonic applications the diaphragm will be relatively stiff, and will have a sharp natural resonant frequency.

The diaphragm has electromechanical means attached thereto for producing or responding to oscillations thereof. As here shown, a magnetostrictive type is employed. A tube 14 of magnetostrictive material such as nickel is employed, and its front end is brazed in an annular groove 15 in the diaphragm. The tube is encricled by a coil 16, and permanent magnets 17 and 18 are aligned with the coil on either side thereof to provide a biasing magnetic field. Although a single magnet will usually suffice, it has been found that the use of two with the coil therebetween markedly improves the shielding of the coil from external magnetic fields when the casing is of nonmagnetic material.

If the coil 16 is energized with an alternating current, it will produce oscillations of diaphragm 13. On the other hand, if the diaphragm is caused to oscillate by received ultrasonic energy, a voltage will be induced in the coil. Thus, the transducer can be used either as a transmitting or receiving device.

To facilitate assembly and adequately support the components in use, coil 16 and magnets 17, 18 are mounted on a cylindrical tube 19. Tube 19 may be of suitable insulating material adapted to withstand the temperature conditions encountered in use. Washers 20 of suitable material such as asbestos protect the coil windings from mechanical damage by contact with the magnets. The front end of tube 19 is supported by a flange 21 which may be formed integrally with the tube. Flange 21 has projecting tongues 21' as shown in FIG. 3. These tongues contact the inner wall of casing member 10 at spaced points, and are preferably tapered as shown at 21" in FIG. 1 to further reduce the area of contact. With this construction, the flange 21 holds the front end of tube 19 centrally positioned within casing member 10, while at the same time the limited area of contact avoids undesirable mechanical coupling with member 10 and damping of the wave oscillations therein.

The rear end of tube 19 is supported by a coil support member 23 of insulating material, having a tubular front section 23' with an internal diameter fitting the tube 19, and a circular rear section 23" fitting into the rear end of casing member 11. The intermediate portion of support member 23 is cut away to support a metal cable clamp 24 and to allow room for making connections from coil leads 25 to the conductors of a coaxial cable 26 at 27.

The rear end of tube 19 is cut diagonally so as to facilitate soldering of the connections 27, and the tube is affixed to member 23 by a rivet 28.

To further facilitate assembly, and to form a secure mechanical assembly during use, a length of flexible tubing 29 is drawn over the magnets 17, 18, coil 16 and the tubular section 23'. A heat reactive shrinkable polyvinyl chloride tubing has been employed with success. When the parts have been assembled and the tubing drawn thereover, heat is applied so that the tubing shrinks and conforms tightly to the outside diameter of the various parts.

Leads 25 from coil 16 pass through a shallow slot 31 in magnet 18 and between the tubing 29 and section 23'. The inner end of coaxial cable 26 passes through a hole in member 23" and the inner end is clamped by a half ring clamp 24 which is mounted on an abutment of coil support 23 with machine screws 32. Coaxial cable 26 has a pair of insulated conductors 33, a braided shield 34 and an outer insulating covering. The conductors 33 are soldered to the coil leads 25 at 27, and the shield 34 is soldered to cable clamp 24. A wire 35 has one end soldered to the cable clamp 24 and the other end makes contact with casing member 11 so that the transducer casing and coaxial shield may be held at a common ground potential.

When assembled, coil support section 23" abuts against an annular ledge 36 in member 11 so that a precise positioning of the coil and magnet assembly is obtained. The assembly is then completed by inserting a rubber washer 37 and an end plate 38, and crimping the end 11' of casing member 11 over the end plate 38.

A mounting flange 41 is formed integrally with casing member 10. In this embodiment it is intended that the mass loading provided by a support (not shown) in which the transducer is inserted will be effective substantially at the front face 41' of flange 41. Accordingly, the distance from the front face 41' to the plane of the diaphragm is made approximately a half-wavelength ($\lambda/2$), as indicated in FIG. 1.

The dimensions of the magnetostrictive tube 14, the diaphragm 13 and the casing section 10 to give the proper natural mechanical resonant frequencies are important in securing optimum operation. These resonant frequencies are functions of the actual physical dimensions and the velocities of propagation of ultrasonic waves in the members. Since the members are physically connected, they are mechanically coupled and the individual natural resonant frequencies interact in producing the overall operating frequency of the transducer.

Diaphragm 13 by itself has a natural resonant frequency, and magnetostrictive tube 14 by itself also has a natural resonant frequency. Since the front end of tube 14 is attached to a central region of diaphragm 13, the coupling between the two elements gives a resultant resonant frequency which differs from the individual resonant frequencies. In general, the length of tube 14 is chosen so that it is substantially a half-wave mechanically resonant element when end-loaded by the impedance of the diaphragm. These factors have been discussed in considerable detail in the aforesaid application and further discussion herein is believed unnecessary.

As the central region of diaphragm 13 moves forwards and backwards in the axial direction of the transducer, the bending of the diaphragm produces radial forces in the peripheral region thereof tending to reduce the diameter of the end 10' of the casing member with which it is united. It is preferred to select the diameter and thickness of casing member 10 so as to promote a ring mode of oscillation at the end 10' thereof. This mode of oscillation is sometimes called the extensional ring mode of vibration. With a circular ring, the center line of the ring forms a circle of periodically varying radius. One complete cycle of oscillation of diaphragm 13 corresponds to two cycles of radial oscillation of end 10', since radially inward forces are produced during both forward and rearward excursions of the diaphragm. Thus, the frequency of oscillation in the ring mode will be twice the frequency of oscillation of the diaphragm.

The ring mode of oscillation will be supported when the path length around end 10' of the casing member is equal to one wavelength at the frequency of the ring oscillation, which in turn is one wavelength at twice the frequency of the diaphragm oscillation. That is, as seen in FIG. 3, the effective circumferential length of the cross-section of member 10 is equal to one wavelength at the frequency of the ring oscillation. This depends upon the effective circumferential length of member 10 and the velocity of propagation of the elastic wave therein, the latter being a function both of the material and the wall thickness. The establishment of the ring mode of oscillation is discussed in more detail in the aforesaid application and need not be described further herein.

As the diaphragm 13 oscillates, forces in the axial direction will be produced at the end 10' of the casing member, and will produce longitudinal elastic waves propagating lengthwise of member 10. The frequency of these longitudinal waves will be the same as the operating frequency of the transducer. If the casing 10 is mass-loaded at a position a half-wavelength from the plane of the diaphragm, as indicated in FIG. 1, the wave action will produce a high impedance to movement of the end 10' in the axial direction. Accordingly, the periphery of diaphragm 13 is restrained from movement in the axial direction, and is effectively clamped.

It will be appreciated that due to the complex nature of the elastic wave oscillations, the intercoupling of several resonant elements, and the dependence of velocity of propagation not only on the particular material employed but also on the thickness thereof, exact analysis is difficult. Also, due to interaction between the various elements, the actual positions of nodes and anti-nodes of the elastic wave oscillations may differ somewhat from those predicted by the equations customarily applied to simple resonant elements. Consequently, although calculations facilitate preliminary design, some departures from calculated dimensions are ordinarily required for optimum results.

Many of these factors have been discussed in the aforesaid application and need not be further discussed herein. In the present invention, however, elastic waves propagating in the casing 10, and mass loading of the casing at a position spaced from the diaphragm, are employed for dynamic clamping. This spacing will, therefore, be discussed further.

In general, mass loading at a half-wavelength nodal position with respect to the diaphragm may be expected to provide maximum dynamic clamping, but reasonable departures therefrom may still provide a sufficiently high impedance at the diaphragm for adequate clamping. The presence of the ring mode of oscillation further assists in this respect. Accordingly, excessively close tolerances are not required during manufacture.

In practice, the acoustic output of the transducer may be measured and the exact location of flange 41 determined for optimum results. Or, if two coils and a single magnet are employed as described hereinafter, one coil may be energized by an oscillator and the output from the other coil measured with the diaphragm free to oscillate in air (undamped condition) and in contact with a liquid such as water (damped condition). The ratio of the outputs under undamped and damped conditions serves as a convenient measure to determine the exact position of the flange 41 which gives optimum results.

The transducer of FIGS. 1 and 2 is designed to be mounted on a support by a screw-type coupling such as shown in FIG. 4. By making the mounting assembly separate, different sizes may be provided for different specific applications. Also, the design shown in FIG. 4 is adapted for use at very high pressures.

Referring to FIG. 4, a mounting assembly is shown comprising members 42 and 43 screwed together at 44. Member 42 has an inwardly projecting portion 42' which abuts against the front face 41' of the transducer flange so that, when members 42 and 43 are tightened, the flange 41 is rigidly held therebetween. The inside diameter of 42' is greater than the outside diameter of 10, so as to avoid affecting the elastic wave oscillation in 10. To avoid damaging the flange 41 in attaching and removing the mounting assembly, and to insure a fluid-tight seal, a thin gasket 45 of a plastic material such as polytetrafluoroethylene (commercially sold under the trade name "Teflon") may be employed.

Mounting member 42 is provided with an external pipe thread 46 for mounting purposes. Member 43 is provided with an internal pipe thread 47 to enable a pipe to be attached in environments where the cable 26 requires protection, or to make the installation explosion-proof, etc. The unthreaded external portions of members 42 and 43 may be hexagonal to permit tightening by wrenches. If desired, thread 47 may be an external rather than an internal thread.

As will be understood, when the assembly is screwed into a support, the mass of the support will be effective at the front face 41' of the flange so as to provide mass loading of casing 10 at that position.

In the particular transducer shown in FIGS. 1 and 2, it was found that the operation could be materially improved by the provision of an undercut or recess in casing 10 beginning at 48. This provides an impedance change or discontinuity insofar as the elastic wave oscillations are concerned, due to the change in wall thickness and the fact that the annular ledge 48 is air-loaded (or, in general, gas or vacuum loaded).

The reasons for the improved performance obtained with the recess are not satisfactorily understood at the present time. As will be understood, the oscillations in casing 10 include both longitudinal waves at the fundamental operating frequency of the transducer, and double-frequency longitudinal waves coupled to casing 10 by the ring oscillation through Poisson's ratio. Due to the impedance mismatch at 48, reflections occur. The overall operation is complex and renders analysis difficult.

In general, the beginning of the undercut is midway between the diaphragm 10 and the flange 41, and in the particular embodiment shown is somewhat nearer the flange. Consequently it is in a region about a quarter-wavelength from the diaphragm at the operating frequency. The exact position for optimum results can be determined by measuring the acoustic output of the transducer, or the undamped to damped ratio if two coils are employed, as described above. The depth of the undercut has not been found to be particularly critical so long as it is a substantial part of the wall thickness, and in practice a reduction in wall thickness to about half the thickness ahead of the undercut has been found satisfactory.

Referring now to FIGS. 5 and 6, a transducer is shown employing a different type of mounting means. This embodiment is designed to be screwed into a support such as a heavy-walled steel vessel, without requiring a separate mounting attachment. To this end the casing 51 is provided with a relatively heavy flange 52 and the portion of the casing near the flange is threaded, as shown at 53. A support 54 is indicated by dot-dash lines. Flange 52 is of hexagonal configuration, as shown in FIG. 6. A ring 55 of resilient material such as rubber is provided to insure a fluid-tight connection when the transducer is tightened in place.

With the transducer in mounted position, it will be understood that the mass of the support will be effective to mass load the casing 51 at substantially the position of the first convolution of thread 53 toward the diaphragm which the support firmly engages. If the thickness of the support wall 54 is equal to or greater than the distance from the beginning of the thread at 53' to the face of flange 52, and the support thread firmly engages the thread 53 at 53', the effective point of mass loading will be substantially at 53'. Accordingly the axial distance from the diaphragm to the beginning of the threaded area at 53' is made approximately a half-wavelength, as indicated. For thinner walls which do not extend to 53', the effective position of the mass loading of the casing will be somewhat greater than a half-wavelength from the diaphragm. This may be satisfactory in many cases, but if necessary different models having different lengths of threaded area may be provided for different ranges of wall thicknesses. Or, a threaded insert of proper thickness may be welded or otherwise secured in the wall.

If the transducer of FIG. 5 is screwed into a thick wall, it is undersirable for the wall to contact the casing 51 in front of the threaded area and impair the elastic wave oscillations. Accordingly, it is advantageous for the diameter at the bottom of the thread to be slightly greater than the diameter of casing 51.

The diameter and wall thickness of casing 51 is preferably selected to promote ring oscillations as described above.

In the embodiment of FIG. 5 the wall thickness of casing 51 was somewhat greater than that of casing 10 in FIG. 1. Also, flange 52 was heavier than flange 41. It was found unnecessary to employ an undercut as in FIG. 1 to obtain satisfactory operation.

The electromechanical actuating means is of the magnetostrictive type, and is similar to that shown in the embodiment of FIGS. 1 and 2. However, the transducer of this embodiment is intended for use in a liquid level indicator system, as described in application Serial No. 113,-320, filed May 29, 1961 by Wilfred Roth for "Liquid Level Indicator." Accordingly, the transducer is provided with two coils 56 and 57 with magnet 58 positioned therebetween. This arrangement, together with the casing 51 extending therealong, serves to substantially eliminate coupling between the coils 56 and 57 except through the oscillating magnetostrictive tube 14, as explained in the application.

The manner in which the coils and magnet are mounted within the casing differs from that of FIGS. 1 and 2. Here they are held mechanically in position by a layer 59 of a foam type material filling the entire space between the outside diameter of the coils and magnet and the inside diameter of the casing 51. The foamed material is selected to have adequate mechanical strength but a low acoustic resistance so as to have little effect on the acoustic oscillations in the casing 51. A monocellular silicone rubber foam has been found satisfactory. A thin washer 61 serves as a stop during injection of the rubber foam, thereby preventing it from contacting the diaphragm. Washer 61 is sufficiently thin and flexible so as not to appreciably affect the acoustic oscillations in the casing.

A pair of leads 62 from front coil 56 pass through a shallow slot in magnet 58, as shown at 58' in FIG. 6, and are held in place by the rubber foam in the slot. Leads 62 pass between coil 57 and the casing and, together with the leads from coil 57, are attached to terminals 63 of the connector 64. A thin circular plate 65 is glued to the foam rubber layer 59 so as to close the chamber containing the magnetostrictive tube 14. Connector 64 has a flange 64' which is held by crimping over the end 66 of the casing. To insure a hermetic seal, a resilient ring 67 may be employed, and a solder overseal applied to the crimped edge of 66 and the adjacent area of connector 64.

To avoid the danger of the soldered wire connections to pins 63 breaking under repeated shock, a layer of insulating material 68 is provided. This is advantageously a heat-curable plastic introduced in powder or liquid form prior to the attachment of socket 64, and cured in place with the diaphragm end up.

In FIG. 1 two coils with an interposed magnet may be employed in place of the arrangement shown, for liquid level applications, etc. Similarly, in FIG. 5 a single coil positioned between two magnets may be employed. For operation at cryogenic temperatures, the rubber foam 59 in FIG. 5 may become rigid and affect wave propagation in the housing. For such uses, a coil and magnet support structure of the type illustrated in FIG. 1 may be employed.

Where a casing of non-magnetic material such as stainless steel is employed because of environmental conditions, in some applications external magnetic fields may be troublesome. In such case magnetic particles may be mixed in the heat-reactive shrinkable tube 29 of FIG. 1, or in the rubber foam layer 59 of FIG. 5, to provide additional shielding.

Although a magnetostrictive actuating mechanism has been specifically described and is preferred, other forms of electromechanical actuating mechanisms such as piezo-electric crystals, etc. can be employed to drive the diaphragm, particularly for high operating frequencies.

It will be understood that many modifications in the specific embodiments described may be made within the spirit and scope of the invention.

I claim:

1. In an acoustic transducer including a diaphragm and means associated therewith for producing or responding to oscillations thereof, the combination which comprises a tubular casing united with the peripheral region of said diaphragm, oscillations of said diaphragm producing longitudinal elastic waves propagating lengthwise of said casing, and means for mass loading said casing at a position therealong approximately a multiple of half-wavelengths from the diaphragm at the transducer operating frequency, said mass loading providing a high impedance to axial movement of the peripheral region of the diaphragm.

2. In an acoustic transduce including a resonant diaphragm and means associated therewith for producing or responding to oscillations thereof, the combination which comprises a tubular casing united with the peripheral region of said diaphragm, oscillations of said diaphragm producing longitudinal elastic wave propagating lengthwise of said casing, the path length around said tubular casing being predetermined to support a ring mode of oscillation in the region thereof united with the diaphragm as the diaphragm oscillates, and means for mass loading said casing at a position therealong approximately a multiple of half-wavelengths from the diaphragm at the transducer operating frequency, said mass loading providing a high impedance to axial movement of the peripheral region of the diaphragm.

3. In an acoustic transducer adapted for mounting on a support and including a diaphragm and means associated therewith for producing or responding to oscillations thereof, the combination which comprises a tubular casing united with the peripheral region of said diaphragm, oscillations of said diaphragm producing longitudinal elastic waves propagating lengthwise of said casing, and means for mounting said casing on said support at a position approximately a multiple of half-wavelengths along the casing from the diaphragm at the transducer operating frequency, whereby mass loading by said support at said position provides a high impedance to axial movement of the peripheral region of the diaphragm.

4. An acoustic transducer adapted for mounting on a support, including a resonant diaphragm and electromechanical means attached to a central region thereof for producing or responding to oscillations thereof, which comprises a tubular casing united at one end thereof with the peripheral region of said diaphragm, said electromechanical means being mounted within the casing and oscillations of the diaphragm producing longitudinal elastic waves propagating lengthwise of the casing, and mounting means on said casing for mounting said casing on said support with the mass of the support effective on the casing at a position approximately a multiple of half-wavelengths along the casing from the diaphragm at the transducer operating frequency, whereby mass loading by said support at said position provides a high impedance to axial movement of the peripheral region of the diaphragm.

5. An acoustic transducer adapted for mounting on a support, including a resonant flat circular metal diaphragm and electromechanical means attached to a central region thereof for producing or responding to oscillations thereof in a direction generally perpendicular to the plane of the diaphragm, which comprises a cylindrical tubular metal casing united at one end thereof with the peripheral region of said diaphragm, said electromechanical means being monuted within the casing and oscillations of the diaphragm producing longitudinal elastic waves propagating lengthwise of the casing, the circumference and wall thickness of the casing being predetermined to resonate in the ring mode of oscillation at the end thereof attached to the diaphragm as the diaphragm oscillates, and mounting means including a flange on said casing for mounting said casing on said support with the mass of the support effective on the casing at a position approximately a multiple of half-wavelengths along the casing from the diaphragm at the transducer operating frequency, whereby mass loading by said support at said position provides a high impedance to axial movement of the peripheral region of the diaphragm.

6. An acoustic transducer in accordance with claim 5 in which the axial distance from the diaphragm to the face of the flange nearer thereto is approximately a half-wavelength at the transducer operating frequency.

7. An acoustic transducer in accordance with claim 5 in which said mounting means includes a threaded area of the casing on the side of said flange toward the diaphragm, the axial distance from the diaphragm to the beginning of the threaded area being approximately a half-wavelength at the transducer operating frequency.

8. An acoustic transducer adapted for mounting on a support, including a resonant flat circular metal diaphragm and electromechanical means attached to a central region thereof for producing or responding to oscillations thereof in a direction generally perpendicular to the plane of the diaphragm, which comprises a cylindrical tubular metal casing united at one end thereof with the peripheral region of said diaphragm, said electromechanical means being mounted within the casing and oscillations of the diaphragm producing longitudinal elastic waves propagating lengthwise of the casing, the circumference and wall thickness of the casing being predetermined to resonate in the ring mode of oscillation at the end thereof attached to the diaphragm as the diaphragm oscillates, mounting means for mounting the transducer on said support and including a flange on said casing extending therearound, the axial distance from the diaphragm to the face of the flange nearer thereto being approximately a half-wavelength at the transducer operating frequency, and a cylindrical recess in the inner surface of said casing extending from the flange toward the diaphragm for improving the acoustic output of the transducer.

9. An acoustic transducer in accordance with claim 8 in which the end of the cylindrical recess toward the diaphragm is midway between the diaphragm and the flange.

10. An acoustic transducer in accordance with claim 8 in which the end of the cylindrical recess toward the diaphragm is approximately a quarter-wavelength from the diaphragm at the transducer operating frequency.

11. An acoustic transducer adapted for mounting on a support which comprises a resonant diaphragm, a tubular casing united with the peripheral region of the diaphragm, an elongated magnetostrictive member attached to a central region of the diaphragm and extending substantially perpendicular thereto within the casing, a coil and magnet assembly encircling the magnetostrictive member, oscillations of said diaphragm producing longitudinal elastic waves propagating lengthwise of the casing, and mounting means on the casing for mounting said casing on said support with the mass of the support effective on the casing at a position approximately a multiple of half-wavelengths along the casing from the diaphragm at the transducer operating frequency, whereby mass loading by said support at said position provides a high impedance to axial movement of the peripheral region of the diaphragm.

12. An acoustic transducer in accordance with claim 11 in which said coil and magnet assembly comprises a cylindrical supporting tube encircling the magnetostrictive member and spaced therefrom, a thin transverse annular disk joined with said supporting tube at the end thereof toward the diaphragm and engaging the casing, and a support member joined with the supporting tube toward the end thereof away from the diaphragm and engaging the casing beyond said position of mass-loading with respect to the diaphragm, said disk and support member supporting the coil and magnet assembly in spaced relation to the casing and to the magnetostrictive member.

13. An acoustic transducer in accordance with claim 12 in which said thin annular disk has projecting portions spaced therearound for engaging the casing only at corresponding spaced positions.

14. An acoustic transducer in accordance with claim 11 including a layer of foamed material in the space between the outside of said coil and magnet assembly and the inside of the casing for supporting the coil and magnet assembly in spaced relation to the magnetostrictive member without substantially impairing elastic wave oscillations in the casing, the end of said layer toward the diaphragm being spaced therefrom.

15. An acoustic transducer adapted for mounting on a support, including a resonant diaphragm and electromechanical means attached to a central region thereof for producing or responding to oscillations thereof, which comprises a tubular casing united at one end thereof with the peripheral region of said diaphragm, said electromechanical means being mounted within the casing and oscillations of the diaphragm producing longitudinal elastic waves propagating lengthwise of the casing, and mounting means on said casing for mounting said casing on said support with the mass of the support effective on the casing at a position approximately a multiple of half-wavelengths along the casing from the diaphragm at the transducer operating frequency, whereby mass loading by said support at said position provides a high impedance to axial movement of the peripheral region of the diaphragm.

References Cited by the Examiner
UNITED STATES PATENTS

| | | | |
|---|---|---|---|
| 2,880,404 | 3/59 | Harris | 340—11 |
| 3,070,790 | 12/62 | Roth | 340—384 |
| 3,100,291 | 8/63 | Abbott | 340—10 |

SAMUEL FEINBERG, *Primary Examiner.*

BENJAMIN A. BORCHELT, CHESTER L. JUSTUS,
*Examiners.*